United States Patent
Lin

(10) Patent No.: US 12,452,839 B2
(45) Date of Patent: Oct. 21, 2025

(54) USER EQUIPMENT AND RESOURCE SELECTION METHOD IN SIDELINK COMMUNICATION

(71) Applicant: GUANGDONG OPPO MOBILE TELECOMMUNICATIONS CORP., LTD., Dongguan (CN)

(72) Inventor: Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 397 days.

(21) Appl. No.: 18/088,231

(22) Filed: Dec. 23, 2022

(65) Prior Publication Data

US 2023/0131882 A1    Apr. 27, 2023

Related U.S. Application Data

(63) Continuation of application No. PCT/CN2021/124455, filed on Oct. 18, 2021.

(60) Provisional application No. 63/104,748, filed on Oct. 23, 2020.

(51) Int. Cl.
*H04W 72/02* (2009.01)
*H04W 72/0446* (2023.01)
*H04W 72/25* (2023.01)
*H04W 72/566* (2023.01)

(52) U.S. Cl.
CPC ....... *H04W 72/02* (2013.01); *H04W 72/0446* (2013.01); *H04W 72/25* (2023.01); *H04W 72/566* (2023.01)

(58) Field of Classification Search
CPC . H04W 72/02; H04W 72/0446; H04W 72/25; H04W 72/566; H04W 88/04; H04W 92/18; H04W 72/20
See application file for complete search history.

(56) References Cited

U.S. PATENT DOCUMENTS

| | | |
|---|---|---|
| 2020/0305127 A1 | 9/2020 | Huang et al. |
| 2020/0328852 A1 | 10/2020 | Tang et al. |
| 2021/0219320 A1* | 7/2021 | Belleschi ............... H04W 72/20 |

FOREIGN PATENT DOCUMENTS

| | | |
|---|---|---|
| CN | 110115080 A | 8/2019 |
| WO | 2020011336 A1 | 1/2020 |

OTHER PUBLICATIONS

Extended European Search Report issued in corresponding European application No. 21881969.6, mailed Mar. 6, 2024.
International Search Report issued in International application No. PCT/CN2021/124455, mailed Dec. 23, 2021.
(Continued)

*Primary Examiner* — Vinncelas Louis
(74) *Attorney, Agent, or Firm* — BAYES PLLC

(57) ABSTRACT

A user equipment (UE) and a resource selection method in sidelink communication are provided. The resource selection method by a first UE includes receiving sidelink data traffic and transmission related information from a second UE and reporting, to the second UE, a set of one or more preferred resources or slot timings of a sidelink resource pool. This can solve issues in the prior art, mitigate a transmission collision, provide a good communication performance, and/or provide high reliability.

16 Claims, 3 Drawing Sheets

410

412 — Receiving sidelink data traffic and transmission related information from a second UE 414 — Receiving sidelink data traffic and transmission related information from a second UE and reporting, to the second UE, a set of one or more preferred resources or slot timings of a sidelink resource pool

(56) References Cited

OTHER PUBLICATIONS

Written Opinion of the International Searching Authority issued in International application No. PCT/CN2021/124455, mailed Dec. 23, 2021.
3GPP TSG RAN WG1 #98, R1-1910779, Chongqing, China, Oct. 14-20, 2019, "Discussion on resource allocation for Mode 2", Agenda item: 7.2.4.2.2, Source: LG Electronics, 14 pages.
3GPP TSG RAN WG1 #102-e, R1-2006184, e-Meeting, Aug. 17-28, 2020, "NR SL Mode 2 enhancement for reliability improvement", Agenda Item: 8.11.2.1, Source: InterDigital Inc., 3 pages.

\* cited by examiner

USER EQUIPMENT AND RESOURCE SELECTION METHOD IN SIDELINK COMMUNICATION

CROSS-REFERENCE TO RELATED APPLICATIONS

The present application is a continuation application of International Application No. PCT/CN2021/124455, filed on Oct. 18, 2021, which claims priority to US application No. 63/104,748, filed on Oct. 23, 2020, and the entire contents thereof are incorporated herein by reference.

BACKGROUND OF DISCLOSURE

1. Field of the Disclosure

The present disclosure relates to the field of communication systems, and more particularly, to a user equipment (UE) and a resource selection method in sidelink (SL) communication, which can provide a good communication performance and/or provide high reliability.

2. Description of the Related Art

In an existing mode 2 resource selection scheme, a transmit user equipment (Tx-UE) needs to first perform sensing of sidelink resources for its surrounding environment in order to select an empty resource, which has not been reserved by other UEs, or a resource with less interference to avoid transmission collision.

SUMMARY

An object of the present disclosure is to propose a user equipment (UE) and a resource selection method in sidelink communication.

In a first aspect of the present disclosure, a first user equipment (UE) includes a memory, a transceiver, and a processor coupled to the memory and the transceiver. The transceiver is configured to receive sidelink data traffic and transmission related information from a second UE and report, to the second UE, a set of one or more preferred resources or slot timings of a sidelink resource pool.

In a second aspect of the present disclosure, a resource selection method in sidelink communication by a first user equipment (UE) includes receiving sidelink data traffic and transmission related information from a second UE and reporting, to the second UE, a set of one or more preferred resources or slot timings of a sidelink resource pool.

In a third aspect of the present disclosure, a second user equipment (UE) includes a memory, a transceiver, and a processor coupled to the memory and the transceiver. The transceiver is configured to transmit, to a first UE, sidelink data traffic and transmission related information, the transceiver is configured to receive, from the first UE, a set of one or more preferred resources or slot timings of a sidelink resource pool, and the processor is configured to select one or more resources for sidelink transmission based on resource sensing and exclusion.

In a fourth aspect of the present disclosure, a resource selection method in sidelink communication by a second user equipment (UE) includes transmitting, to a first UE, sidelink data traffic and transmission related information, receiving, from the first UE, a set of one or more preferred resources or slot timings of a sidelink resource pool, and selecting one or more resources for sidelink transmission based on resource sensing and exclusion.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In an existing mode 2 resource selection scheme (also known as autonomous resource selection mode) for sidelink (SL) communication based on Release 16 5th generation-new radio (5G-NR) mobile technology, a transmit user equipment (Tx-UE) needs to first perform sensing of sidelink resources for its surrounding environment in order to select an empty resource, which has not been reserved by other UEs, or a resource with less interference to avoid transmission collision. This kind of mechanism is useful and appropriate when SL transmission is broadcast and intended for reception by all surround UEs. However, when there is only one target receiver UE (Rx-UE) for the SL transmission (e.g., in a SL unicast communication) or the number of target receiver UEs is not large or very limited (e.g., in a SL groupcast communication), it becomes important to be also aware of the SL communication channel environment surrounding the target receiver UE(s). For example, when there is some distance apart between the Tx-UE and Rx-UE, the Tx-UE won't be able to detect/sense SL resource usage and reservation status surrounding the Rx-UE and may wrongly select and transmit its data packet using a resource that has been reserved by another UE for transmission. Subsequently, SL transmissions from the Tx-UE and the another UE will collide and become not decodable by the target Rx-UE. This issue in a direct wireless communication without a centralized control and management is commonly known as the "hidden-node problem".

Furthermore, when a Tx-UE is engaged in a SL unicast or groupcast session where it is also vital for the Tx-UE to receive communication/transmissions from the other UE or other member UEs in the same group, according to the existing mode 2 resource selection scheme, there is a possibility that the Tx-UE may select a resource that overlaps with the other UE's or other member UE's transmission. When this occurs, both UEs in a unicast session or multiple UEs in a groupcast session will not be able to hear each other's transmissions. This issue in an autonomous resource selection scheme is commonly known as the "half-duplex problem".

Figure 1:
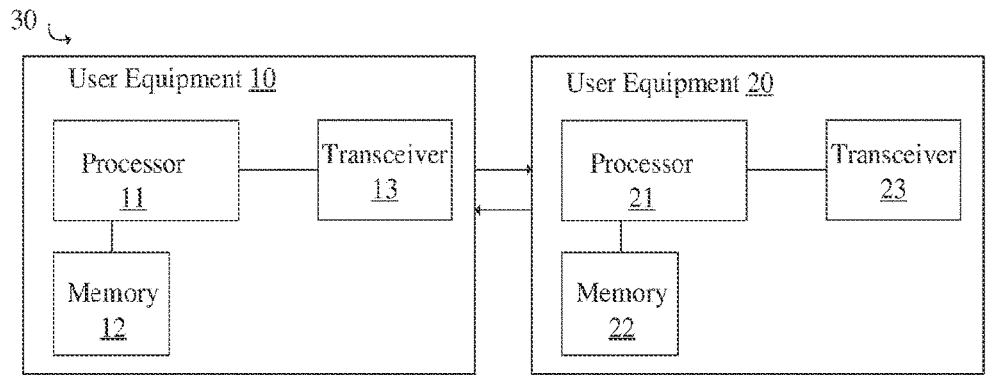
FIG. 1 is a block diagram of user equipments (UEs) of communication in a communication network system according to an embodiment of the present disclosure.

For some embodiments of the present disclosed methods of resource selection scheme cooperating between a SL transmitting UE and a receiving UE, it aims to resolve the above identified hidden node and half-duplex problems in the existing mode 2 resource allocation, by pre-filtering/excluding reserved resources at the Rx-UE and sending a set of candidate/preferred resources to the Tx-UE for selection. Further, some embodiments of the present disclosed methods also resolve issues relating to the following operating scenarios where the Tx-UE should also take into consideration when selecting a suitable/appropriate SL resource for transmission. 1. Other planned/scheduled SL or UL transmission, or DL reception at both the Tx-UE and target Rx-UE. 2. DRX cycle for the target Rx-UE FIG. 1 illustrates that, in some embodiments, one or more user equipments (UEs) 10 (such as a first UE) and one or more user equipments (UEs) 20 (such as a second UE) of communication in a communication network system 30 according to an embodiment of the present disclosure are provided. The communication network system 30 includes one or more UEs 10 and one or more UE 20. The UE 10 may include a memory 12, a transceiver 13, and a processor 11 coupled to the memory 12 and the transceiver 13. The UE 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21 and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2UN) according to a sidelink technology developed under 3rd generation partnership project (3GPP) long term evolution (LTE) and new radio (NR) Release 17 and beyond. UEs are communicated with each other directly via a sidelink interface such as a PC5 interface. Some embodiments of the present disclosure relate to sidelink communication technology in 3GPP NR release 17 and beyond, for example providing cellular—vehicle to everything (C-V2X) communication.

In some embodiments, the UE 10 may be a sidelink packet transport block (TB) transmission UE (Tx-UE). The UE 20 may be a sidelink packet TB reception UE (Rx-UE) or a peer UE. The sidelink packet TB Rx-UE can be configured to send ACK/NACK feedback to the packet TB Tx-UE. The peer UE 20 is another UE communicating with the Tx-UE 10 in a same SL unicast or groupcast session.

Figure 2:
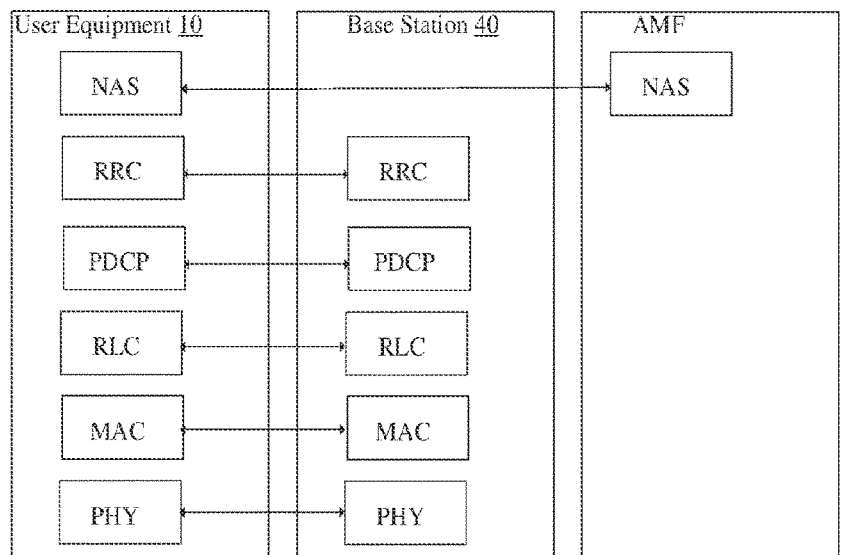
FIG. 2 is a schematic diagram illustrating an example user plane protocol stack according to an embodiment of the present disclosure.

FIG. 2 illustrates an example user plane protocol stack according to an embodiment of the present disclosure. FIG. 2 illustrates that, in some embodiments, in the user plane protocol stack, where service data adaptation protocol (SDAP), packet data convergence protocol (PDCP), radio link control (RLC), and media access control (MAC) sublayers and physical (PHY) layer may be terminated in a UE 10 and a base station 40 (such as gNB) on a network side. In an example, a PHY layer provides transport services to higher layers (e.g., MAC, RRC, etc.). In an example, services and functions of a MAC sublayer may comprise mapping between logical channels and transport channels, multiplexing/demultiplexing of MAC service data units (SDUs) belonging to one or different logical channels into/from transport blocks (TBs) delivered to/from the PHY layer, scheduling information reporting, error correction through hybrid automatic repeat request (HARQ) (e.g. one HARQ entity per carrier in case of carrier aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or transmission time interval (TTI) durations. In an example, automatic repeat request (ARQ) may operate on any of the numerologies and/or TTI durations the logical channel is configured with. In an example, services and functions of the PDCP layer for the user plane may comprise sequence numbering, header compression, and decompression, transfer of user data, reordering and duplicate detection, PDCP PDU routing (e.g., in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping quality of service Indicator (QFI) in downlink (DL) and uplink (UL) packets. In an example, a protocol entity of SDAP may be configured for an individual PDU session.

Figure 3:
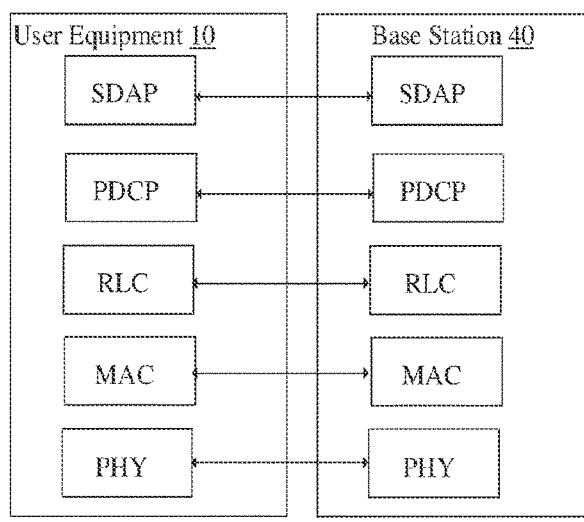
FIG. 3 is a schematic diagram illustrating an example control plane protocol stack according to an embodiment of the present disclosure.

FIG. 3 illustrates an example control plane protocol stack according to an embodiment of the present disclosure. FIG. 2 illustrates that, in some embodiments, in the control plane protocol stack where PDCP, RLC, and MAC sublayers and PHY layer may be terminated in a UE 10 and a base station 40 (such as gNB) on a network side and perform service and functions described above. In an example, RRC used to control a radio resource between the UE and a base station (such as a gNB). In an example, RRC may be terminated in a UE and the gNB on a network side. In an example, services and functions of RRC may comprise broadcast of system information related to AS and NAS, paging initiated by SGC or RAN, establishment, maintenance and release of an RRC connection between the UE and RAN, security functions including key management, establishment, configuration, maintenance and release of signaling radio bearers (SRBs) and data radio bearers (DRBs), mobility functions, QoS management functions, UE measurement reporting and control of the reporting, detection of and recovery from radio link failure, and/or non-access stratum (NAS) message transfer to/from NAS from/to a UE. In an example, NAS control protocol may be terminated in the UE and AMF on a network side and may perform functions such as authentication, mobility management between a UE and an AMF for 3GPP access and non-3GPP access, and session management between a UE and a SMF for 3GPP access and non-3GPP access.

When a specific application is executed and a data communication service is required by the specific application in the UE, an application layer taking charge of executing the specific application provides the application-related information, that is, the application group/category/priority information/ID to the NAS layer. In this case, the application-related information may be pre-configured/defined in the UE. (Alternatively, the application-related information is received from the network to be provided from the AS (RRC) layer to the application layer, and when the application layer starts the data communication service, the application layer requests the information provision to the AS (RRC) layer to receive the information.)

In some embodiments, the transceiver 13 is configured to receive sidelink data traffic and transmission related information from the second UE 20 and reporting, to the second UE 20, a set of one or more preferred resources or slot timings of a sidelink resource pool. This can solve issues in the prior art, mitigate a transmission collision, provide a good communication performance, and/or provide high reliability.

In some embodiments, the transceiver 23 is configured to transmit, to the first UE 10, sidelink data traffic and transmission related information, the transceiver 23 is configured to receive, from the first UE 10, a set of one or more preferred resources or slot timings of a sidelink resource pool, and the processor 21 is configured to select one or more resources for sidelink transmission based on resource sensing and exclusion. This can solve issues in the prior art, mitigate a transmission collision, provide a good communication performance, and/or provide high reliability.

Figure 4:
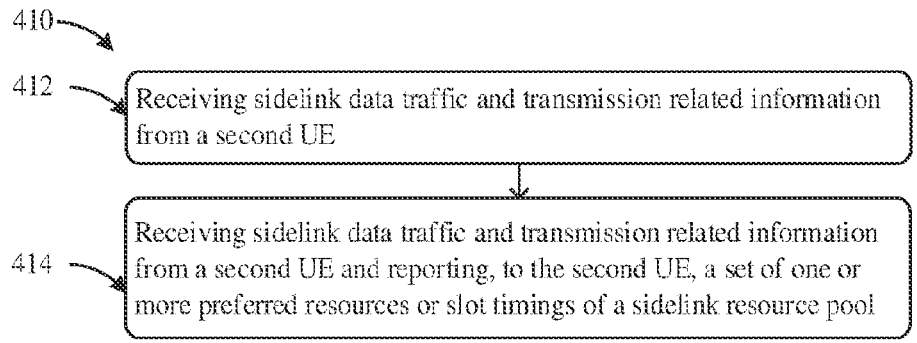
FIG. 4 is a flowchart illustrating a resource selection method in sidelink communication by a first user equipment (UE) according to an embodiment of the present disclosure.

FIG. 4 illustrates a resource selection method 410 in sidelink communication by a first user equipment (UE) according to an embodiment of the present disclosure. In some embodiments, the method 410 includes: a block 412, receiving sidelink data traffic and transmission related information from a second UE, and a block 414, receiving sidelink data traffic and transmission related information from a second UE and reporting, to the second UE, a set of one or more preferred resources or slot timings of a sidelink resource pool. This can solve issues in the prior art, mitigate a transmission collision, provide a good communication performance, and/or provide high reliability.

In some embodiments, the method further comprises performing sensing on the sidelink resource pool; and performing exclusion of one or more sidelink resources from a candidate set of the sidelink resource pool. In some embodiments, performing sensing on the sidelink resource pool is according to at least one of the followings: the sidelink data traffic and transmission related information, an indication from the second UE, or a corresponding resource pool in which a sidelink control information (SCI) is transmitted from the second UE. In some embodiments, the sidelink data traffic and transmission related information is provided as a part of UE assistance information (UEAI) and/or SCI from the second UE. In some embodiments, the sidelink data traffic and transmission related information comprises at least one of the followings: a packet priority or layer 1 priority information for a transport block (TB) or a medium access control (MAC) protocol data unit (PDU) to be transmitted, a size of the TB or the MAC PDU, a modulation and coding scheme (MCS) index, and/or a MCS table, a frequency resource size or a number of contiguous subchannels, a remaining packet delay budget (PDB) for the TB or the MAC PDU, a start timing of a resource selection window, and/or a length of the resource selection window, a resource reservation interval/periodicity, a hybrid automatic repeat request (HARQ) feedback indicator and/or a physical sidelink feedback channel (PSFCH) resource configuration, or the sidelink resource pool.

In some embodiments, the indication from the second UE is provided in a UEAI from the second UE. In some embodiments, performing sensing on the sidelink resource pool comprises at least one of the followings: decoding a physical sidelink control channel (PSCCH) within a sensing window in the sidelink resource pool, receiving an SCI within the sensing window in the sidelink resource pool, measuring a reference signal received power (RSRP), or measuring a channel busy ratio (CBR). In some embodiments, performing exclusion of the one or more sidelink resources from the candidate set of the sidelink resource pool when at least one of the followings occurs: overlapping in both frequency resource blocks and a time slot with a resource reserved by a third UE and a measured RSRP of a reserved resource is higher than a RSRP threshold or a difference of measured RSRPs for the second UE and the third UE is larger than a level, overlapping in time with a periodically reserved resource indicated by the third UE, overlapping in time with a resource already selected or reserved by the first UE or by the third UE which belong to the same groupcast session, overlapping in time with a discontinuous reception (DRX) OFF or inactive time duration of the first UE, or overlapping in time with a scheduled/planned uplink transmission and/or a downlink reception of the first UE.

In some embodiments, reporting, to the second UE, the set of one or more preferred resources or slot timings of the sidelink resource pool is periodic or event triggered. In some embodiments, the method further comprises reporting, to the second UE, an additional information of the sidelink resource pool. In some embodiments, the additional information of the sidelink resource pool comprises a selection of a resource pool index or type, a resource selection window, a source identifier (ID), a destination ID, and/or a measured CBR of the sidelink resource pool.

Figure 5:
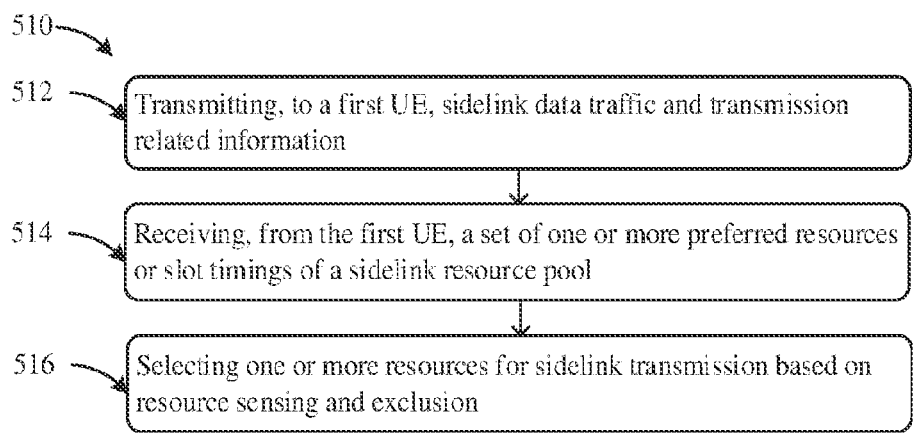
FIG. 5 is a flowchart illustrating a resource selection method in sidelink communication by a second user equipment (UE) according to an embodiment of the present disclosure.

FIG. 5 illustrates a resource selection method 510 in sidelink communication by a second user equipment (UE) according to an embodiment of the present disclosure. In some embodiments, the method 510 includes: a block 512, transmitting, to a first UE, sidelink data traffic and transmission related information, a block 514, receiving, from the first UE, a set of one or more preferred resources or slot timings of a sidelink resource pool, and a block 516, selecting one or more resources for sidelink transmission based on resource sensing and exclusion. This can solve issues in the prior art, mitigate a transmission collision, provide a good communication performance, and/or provide high reliability.

In some embodiments, the sidelink data traffic and transmission related information is provided as a part of UE assistance information (UEAI) and/or SCI to the first UE. In some embodiments, the sidelink data traffic and transmission related information comprises at least one of the followings: a packet priority or layer 1 priority information for a transport block (TB) or a medium access control (MAC) protocol data unit (PDU) to be transmitted, a size of the TB or the MAC PDU, a modulation and coding scheme (MCS) index, and/or a MCS table, a frequency resource size or a number of contiguous subchannels, a remaining packet delay budget (PDB) for the TB or the MAC PDU, a start timing of a resource selection window, and/or a length of the resource selection window, a resource reservation interval/periodicity, a hybrid automatic repeat request (HARQ) feedback indicator and/or a physical sidelink feedback channel (PSFCH) resource configuration, or the sidelink resource pool. In some embodiments, receiving, from the first UE, the set of one or more preferred resources or slot timings of the sidelink resource pool is periodic or event triggered.

In some embodiments, the method of claim further comprises receiving, from the first UE, an additional information of the sidelink resource pool. In some embodiments, the additional information of the sidelink resource pool comprises a selection of a resource pool index or type, a resource selection window, a source identifier (ID), a destination ID, and/or a measured CBR of the sidelink resource pool. In some embodiments, transmitting, to the first UE, the sidelink data traffic and transmission related information is periodic or event triggered. In some embodiments, selecting the one or more resources for sidelink transmission based on resource sensing and exclusion comprises performing sensing operation based on a decoding PSCCH/SCI and a measuring RSRP of a received PSCCH/SCI in slots belong to the sidelink resource pool. In some embodiments, selecting the one or more resources for sidelink transmission based on resource sensing and exclusion comprises initializing a set of candidate resources by taking a reported set of preferred resources from the first UE or by initializing to a set of all possible resources within a selection window in the sidelink resource pool.

In some embodiments, selecting the one or more resources for sidelink transmission based on resource sensing and exclusion further comprises performing exclusion of resources from the set of candidate resources based on a sensing outcome. In some embodiments, selecting the one or more resources for sidelink transmission based on resource sensing and exclusion further comprises excluding one or more resources due to time overlapping with already selected and/or reserved resources by the second UE for transmission of TBs or MAC PDUs, and/or time overlapping with a scheduled/planned uplink transmission and/or a downlink reception by the second UE. In some embodiments, if a remaining candidate set after the resource exclusion is not based on the reported set of preferred resources from the first UE, a final selection of sidelink resource is based on common resources between the remaining candidate set and the reported resource set. In some embodiments, the final selection of sidelink resource is performed by the second UE based on random selection or prioritizing resources that are earlier in time.

In some embodiments of the present disclosure, inventive cooperated resource selection methods for sidelink (SL) communication based on 5th generation-new radio (5G-NR) technology between at least two user equipment's (UEs) are provided to avoid transmission collisions and minimize interference to other UEs' transmission(s). Some embodiments comprise a first UE, a SL monitoring/receiving UE (Rx-UE), receiving information relates to data transfer intended to be sent over the sidelink from a second UE, a SL data transmitting UE (Tx-UE), and in collaborating with second UE's (Tx-UE) resource selection process the first UE (Rx-UE) providing one or more preferred resources that should be used by the second UE (Tx-UE) for the data transfer over sidelink. In order to perform/carry out the proposed cooperated resource selection methods, at least one of the first and second UE or both UEs should be operated in an autonomous resource selection mode in SL, also commonly known as resource allocation mode 2 in NR sidelink or vehicle-to-everything (V2X) communication. However, in contrast to the existing 5G-NR SL mode 2 operation (e.g. according to 3GPP release 16) where SL transmission resources are purely selected by the data transmitting UE on its own, the first UE (data receiving Rx-UE) cooperates with the second UE (data transmitting Tx-UE) in resource selection by providing a set of candidate resources that are preferred by the first UE (Rx-UE) for reception of the SL communication according to the present disclosed proposed method.

Figure 6:
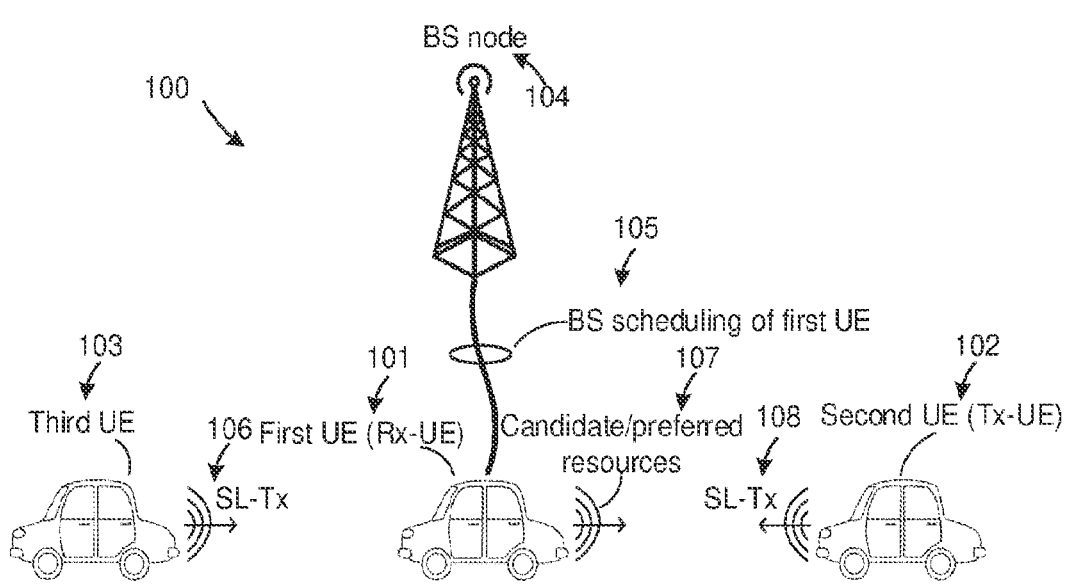
FIG. 6 is a schematic diagram illustrating exemplary illustration of a sidelink communication operating scenario according to an embodiment of the present disclosure.

In reference to diagram 100 in FIG. 6 for a sidelink (SL) operating scenario where a first UE (Rx-UE) 101 communicates over the SL interface with a second UE (Tx-UE) 102 using broadcast, unicast or groupcast transmission, and at the same time receives SL transmissions coming from a third UE 103, which may or may not be in SL communication range with the second LIE (Tx-UE) 102 but the third UE 103 could be participating in a same gmupcast communication session with the first UE 101 and the second UE 102. Furthermore, the first UE 101 could be radio resource control (RRC) connected to a network base station (BS) node 104, a gNodeB if the RRC connection is in 5G-NR or an eNodeB if in 4th generation—long term evolution (4G-LTE), and receives BS scheduling 105 for DL reception, UL transmission, and/or SL transmission, while the first UE (Rx-UE) 101 still in SL communication with the second UE (Tx-UE) 102 and the third UE 103. Whilst the first UE 101 is RRC CONNECTED to the BS node 104, it could be operating in mode 1 resource allocation where all of its resources for SL transmission are fully determined and scheduled by the BS node 104 only. However, for the proposed cooperated resource selection methods, the first UE 101 additionally performs sensing/monitoring of sidelink resource usage (e.g., SL-Tx and resource reservation 106 from the third UE 103) on a SL resource pool (RP) in order to determine and provide one or more candidate/preferred resources 107 to the second UE 102 for avoiding collisions and half-duplex problem with SL-Tx 108 from the second UE. And thus, enhancing the overall reliability and performance of SL communication.

In order to realize the above proposed cooperated resource selection and to resolve the problems described in a previous section, details of processing methods and functions that should be performed by the first UE (Rx-UE) are described in the following embodiments.

Processing Methods and Functions for the First UE in Cooperated Sidelink Resource Selection:

In one embodiment, a set of one or more candidate/preferred sidelink resources is determined and indicated by a first UE (a data reception Rx-UE) to a second UE (a data transmission Tx-UE) based on a resource sensing and exclusion procedure in the proposed cooperated sidelink resource selection methods.

Sensing of Sidelink Resource Utilization and Reservation of a Sidelink Resource Pool (RP):

Before the first UE (Rx-UE) can perform any radio measurement or monitoring of SL transmission from other UEs, the first UE needs to select a sidelink resource pool (RP) for which it should perform the sensing operation. In the proposed cooperated resource selection methods, a suitable RP for the first UE to determine a set of candidate/preferred resources and subsequently indicate to the second UE (Tx-UE) for SL transmission should be selected based on one or more of the following methods.

SL data/transmission related information: In order for the first UE (Rx-UE to cooperate/collaborate in the resource selection process of the second LIE (Tx-UE), some attribute information about second UE's SL data/traffic/transmission is required. For the selection of a suitable RP by the first UE (Rx-UE), at least one or more of the following attribute information should be provided by the second UE and this information could be provided as part of UE assistance information (UEAI) and/or sidelink control information (SCI). The information includes at least one of the followings: 1. Packet priority or Layer 1 priority information for the packet transport block (TB) or medium access control (MAC) protocol data unit (PDU) to be transmitted ($prio_{TX}$). 2. Size of the transport block or MAC PDU (also commonly known as TBS), modulation and coding scheme (MCS) index and/or MCS table. A resource pool that is able to support the TBS, MCS and/or MCS table indicated by the second UE in the configuration parameter sl-AdditionalMCS-Table. 3. Frequency resource size/number of contiguous subchannels ($L_{subCH}$). A resource pool with configured sl-NumSubchannel (number of subchannels) should be at least greater than or equal to ≥the required frequency resource size/number of contiguous subchannels ($L_{subCH}$) for the MAC PDU/data TB to be transmitted by the second UE. 4. Remaining packet delay budget (PDB). 5. Resource reservation interval ($P_{rsvp\_TX}$). A resource pool with sl-MultiReserveResource parameter enabled and the indicated $P_{rsvp\_TX}$ from the second UE (Tx-UE's) MAC PDU/data TB is included in the sl-ResourceReservePeriodList parameter when $P_{rsvp\_TX}$ is not 0 ms. 6. Hybrid automatic repeat request (HARQ) feedback enabled/disabled and/or physical sidelink feedback channel (PSFCH) resource configurations; A resource pool with PSFCH resource configured (i.e., sl-PSFCH-Period parameter is not set to 0) when the indicated HARQ feedback is set to enabled and/or PSFCH resources is required from the second UE.

Direct Indication from the Second UE:

Besides sidelink data/traffic/transmission related information that could be provided by the second UE (Tx-UE), an intended or pre-selected sidelink resource pool may be also indicated in UEAI from the second UE (e.g. a sidelink RP ID/index). When a sidelink RP is included in the UEAI from the second UE (Tx-UE), the first UE (Rx-UE) takes this direct indication into account when selecting a suitable RP for the resource sensing. But the first UE (Rx-UE) may select a different RP than the indicated one due to high congestion (e.g., high measured channel busy ratio CBR).

Corresponding Resource Pool:

Sometimes, when two SL transmitting UEs are not within each other's coverage (e.g. between the second UE 102 and the third UE 103), the first LIE 101 may detect a potential transmission collision between them from reading resource assignment and/or reservation information in their transmitted SCIs/physical sidelink control channel (PSCCH). When this is detected and/or UEAI is not provided from the second UE, the first UE may still provide a set of candidate/preferred resources to the second UE utilizing the decoded resource assignment and reservation information in SCI to avoid the potential collision. In this case, the selection of a sidelink resource pool could be based on the same/corresponding resource pool in which the SCI is transmitted from the second UE.

Once the resource pool has been determined, the first UE (Rx-UE) performs a sensing and resource exclusion procedure according to the configured parameters of the selected resource pool, such as sl-RS-ForSensing (PSCCH-DMRS or PSSCH-DMRS). sl-SensingWindow (100 or 1100 ms), selection of $T_{2\ min}$ from the sl-SelectionWindowList (in accordance with priority of the SL packet TB/MAC PDU), sl-ResourceReservePeriodList (if sl-MultiReserveResource is enabled) and/or sl-ThresPSSCH-RSRP-List (based on priority of the decoded SCI and priority of the packet TB/MAC PDU to be transmitted). The actual resource sensing operation for the selected resource pool in the proposed cooperated resource selection methods comprises of one or more of the following functions.

1. Monitoring of slots belong to the selected sidelink resource pool within a configured sensing window by decoding PSCCH and receiving SCI from other SL UEs in the field, to obtain parameter information including at least one of the fields such as priority ($prio_{RX}$), frequency resource assignment, time resource assignment and resource reservation period ($P_{rsvp\_RX}$), if present. From obtaining the frequency and time resource assignment fields in each received SCT format 1-A, the first UE is able to determine the resource allocations of other UE's Num sidelink transmissions.

2. Measurement of reference signal received power (RSRP) for the decoded PSCCHs; the measurement could be based on demodulation reference signal (DMRS) of PSCCH or physical sidelink shared channel (PSSCH) according to a configuration setting for the selected sidelink RP.

3. Measurement of channel busy ratio (CBR), which is a computation of ratio of the number of used/reserved resources detected by the first UE against the among of total resources within the configured sensing window.

Performing Exclusion of SL Resources from a Set of Candidate Resources According to any One of the Following Conditions:

Firstly, a full set of candidate/preferred resources ($S_A$), which covers all possible sidelink resources within a selection window, should be initialized before performing any of resource exclusion. And the selection window should be determined based on at least a remaining PDB information and a $T_{2\_min}$ from the configured selection window list corresponding to priority level of the sidelink TB/MAC PDU to be transmitted ($prio_{TX}$). Then a sidelink resource from the candidate/preferred set $S_A$ is to be excluded when any one of the following conditions is met.

If the sidelink resource within the candidate/preferred set $S_A$ overlaps in both frequency resource blocks and time slot with a sidelink resource indicated/reserved by another UE (e.g., the third UE), and the measured RSRP of the indicated/reserved sidelink resource from said another UE is higher than a RSRP threshold or the difference of the measured RSRPs for the second and the said another UE is larger than a level. The said level for the measured RSRP difference could be pre-defined, pre-configured or network configured, and the said RSRP threshold could be derived based on one of the followings:

1. Pre-configuration or network radio resource control (RRC) configuration. 2. A RSRP threshold level from the configured sl-ThresPSSCH-RSRP-List that corresponds to a combination of priority value in the received SCI ($prio_{RX}$) and priority value of the sidelink TB/MAC PDU for transmission ($prio_{TX}$). 3. A RSRP threshold level from a separate configured RSRP threshold list that is different to the above sl-ThresPSSCH-RSRP-List, and it corresponds to a combination of priority value in the received SCI ($prio_{RX}$) and priority value of the sidelink TB/MAC PDU for transmission ($prio_{TX}$). 4. The said RSRP threshold=TH_x−23 dB−measured RSRP of the second UE, where TH_x is a RSRP threshold level from the configured sl-ThresPSSCH-RSRP-List that corresponds to a combination of priority value in the received SCI ($prio_{RX}$) and priority value of the sidelink TB/MAC PDU for transmission ($prio_{TX}$).

In some embodiments, if one of the periodically reserved sidelink resources indicated by another UE overlaps with the sidelink resource within the candidate/preferred set $S_A$. In some embodiments, the sidelink resource within the candidate/preferred set $S_A$ overlaps in time with a sidelink resource already selected or reserved by the first UE for its own transmission to avoid half-duplex problem between the first and second UEs, a sidelink resource already reserved by another UE which belong to the same groupcast session (e.g., with same destination ID) to avoid half-duplex problem between the second and the said another UEs, first UE's discontinuous reception (DRX) cycle for sidelink reception, and/or first UE's scheduled/planned UL transmission and/or DL reception.

The above resource exclusion process could be performed by first UE's lower layer function (e.g., at L1), upper layer function (e.g., at MAC layer), or a combination of both L1 and MAC processing functions. For example, exclusion of resources reserved by a third UE and slots of resources that falls within on reservation periods allowed by the resource pool for none-monitored slots during the sensing process are done at the lower layer. Then exclusion of first UE self-(re) selected, reserved and scheduled resources, slots of resources reserved/belong to other member UEs of the same group, and first UE's planned/scheduled UL transmission and/or DL reception are done at the higher layer.

Reporting of Remaining Resources in the Candidate Set or Slot Timings to the Second UE (Tx-UE):

Once the sidelink resources that have already reserved by other UEs and resources that are not receivable by the first UE are excluded from the full candidate set $S_A$ in step 2, one or more of the remaining resources in the set $S_A$ should be reported to the second UE for further selection. The reporting could be performed periodically or event triggered by receiving UEAI and/or SCI from the second UE (Tx-UE), or based on detection of potential SL transmission collision due to reservation/indication of at least one overlapping resource from the second UE with another UE (e.g., a third UE). Besides the set of remaining candidate/preferred resources from $S_A$, other additional information that could also be sent to the second UE (Tx-UE) as part of the proposed cooperated sidelink resource selection methods include: selection of resource pool index or type (e.g., inclusion of PSFCH resources), resource selection window (T1 starting slot/a slot offset and/or T2), source ID, destination ID, and/or measured CBR of the selected resource pool.

Second UE (Tx-UE) Behavior and Processing Functions for Cooperated Sidelink Resource Selection and Reporting:

In another embodiment, the behavior and processing functions to be performed by the second UE (Tx-UE) for the proposed cooperative sidelink resource selection methods are described. In order for the second UE to select appropriate resources for transmitting/delivering data TB/MAC PDU over the sidelink (PC5 interface) without creating significant reception interference to other SL transmissions at a target receiver, causing transmission collision with other UEs, and solving the half-duplex issue describe previously, the second UE should jointly consider at least a provided/reported set of candidate/preferred SL resources from the first UE and a set of candidate resources determined by the second UE.

The overall processing functions for the second UE in the proposed cooperative sidelink resource selection methods include the followings.

Providing/Transmitting Information Relating to Resource Allocation as Part of UEIA and/or SCI Over Sidelink:

Upon new data packet arrival for SL transmission at the second UE (data Tx-UE), the UE should provide/transmit some attributes about its SL data/traffic/transmission periodically or event triggered. For example, the second UE should provide/transmit this information periodically when the SL data traffic requires periodic transmission (e.g., resource reservation field in SCI is not 0 ms), or otherwise event triggered for aperiodic transmissions. The SL data, traffic and transmission attribute information should include one or more of the followings. 1. Packet priority or Layer 1 priority of the data TB or MAC PDU to be transmitted ($prio_{TX}$). 2. Size of the data TB or MAC PDU (also commonly known as TBS), MCS index and/or MCS table. 3. Frequency resource size/number of contiguous subchannels ($L_{subCH}$). 4. Remaining packet delay budget (PDB) for the data TB/MAC PDU, start timing of resource selection window, length of the resource selection window, and/or $T_2$. 5. Resource reservation interval/period ($P_{rsvp\_TX}$). 6. Hybrid automatic repeat request (HARQ) feedback enabled/disabled and/or physical sidelink feedback channel (PSFCH) resource configurations. 7. Sidelink resource pool for transmission of the data TB/MAC PDU.

Receiving Information Relating to Resource Selection from the First UE:

The resource selection information contains at least a set of candidate sidelink resources preferred by the first UE. The reception of the set of candidate/preferred SL resources could be periodically (e.g., for every resource reservation period) or event triggered (due to detection of a potential transmission collision). Beside the set of candidate/preferred sidelink resources, other resource selection related information may be provided by the first UE to the second UE include selection of resource pool index or type (e.g., inclusion of PSFCH resources), resource selection window (T1 starting slot/a slot offset and/or T2), source ID, destination ID, and/or measured CBR of the selected resource pool.

Selecting One or More Resources for SL Transmission Based on a Resource Sensing and Exclusion Procedure:

The second UE's selection of resource(s) for SL transmission should be based on the reported set of candidate resources from the first UE (Rx-UE) and another set of candidate resources from the second UE, wherein the another set of candidate resources from the second UE is determined according to sensing and resource exclusion results performed by the second UE. The sensing operation for the second UE should be performed at least by decoding PSCCH/SCI and measuring RSRP of the received PSCCH/SCI in slots belong to a resource pool and within a sensing window. By doing so, the second UE will be able to get a good sense of SL resource usage and reservation status around its surrounding environment. Then the another set of candidate resources ($S_A'$) for the second UE should be initialized to the set of all possible candidate resources within a resource selection window. Alternatively, the second UE may take the reported set of candidate resources preferred by the first UE ($S_A$) as the another set of candidate resources ($S_A'$) to be used for resource exclusion. The resource exclusion part should be based on at least the sensing outcome described above. That is, if a sidelink resource within the another set of candidate resources ($S_A'$) overlaps in frequency resource blocks and time slot with an indicated/reserved resource from another UE and the measured RSRP of the indicated/reserved resource from the another UE is higher than an associated configured RSRP threshold, then the overlapping sidelink resource should be excluded from the another set of candidate resources ($S_A'$). Additionally, the second UE could further exclude sidelink resources from the candidate resource set ($S_A'$) due to time overlap with one or more of the followings before final selection of resources for SL transmission, such as selected and/or reserved resources by the second UE for transmission of other TBs/MAC PDUs, and/or scheduled/planned UL transmission and/or DL reception by the second UE.

In some embodiments, the final selecting of SL resource(s) from the remaining candidate set ($S_A'$) may be done simply by random selection or prioritizing resources that are earlier in time. For example, by selecting resource that is the earliest in time or within a set of earlier in time resources from the remaining candidate set $S_A$, to minimize the chance of a resource being reserved by others prior to SL transmission from the second UE. If the remaining candidate set ($S_A'$) determined by the second UE was not initialized/taken from the reported candidate/preferred resource set ($S_A$) from the first UE, the final selection of SL resource(s) should be based on the common/interception resources between these two sets ($S_A'$ and $S_A$).

It should be noted that the above UE behavior and processing functions of the proposed cooperative sidelink resource (re-)selection scheme for the first UE/Rx-UE and the second UE/Tx-UE are described irrespective of communication layers (i.e., physical layer/Layer 1, medium access control (MAC) layer, radio resource control (RRC) layer, PDCP layer or the application layer). It should be understood that the described/proposed processing functions can be performed at any of the communication layers within a UE, and they may be performed separately or jointly by different layers or same layer. For example, a transceiver module of the first UE (Rx-UE) may perform the reception of SL signals (e.g., DMRS) and channels (PSCCH/PSSCH) transmitted by the second UE (Tx-UE), the physical layer/L1 of the UE performs decoding of the received PSCCH/PSSCH and passed the decoded control and/or data information to the MAC layer for further processing such as selection of a sidelink resource pool. Then the MAC layer may further trigger the PHY layer/L1 to perform resource monitoring within a sensing window and exclusion of candidate resources and report back to the MAC layer a remaining subset of candidate resources. The MAC layer may exclude further resources from the reported subset of candidate resources (e.g., based on its planned or scheduled SL/UL/DL slots) before sending a final set of resources to the second UE (Tx-UE) via PC5-RRC configuration signaling or SCI encoded in PSCCH/PSSCH. Similarly, the overall described behavior/processing functions for the second UE (Tx-UE) may be separately performed by UE's PHY layer/L1 (e.g., decoding of the received SL signals and channels, sensing and resource exclusion triggered by MAC layer) and MAC layer (e.g., for the final selection of one or more SL resources for transmission).

In summary, in order for the first UE (a target Rx UE) to determine a set of preferred resources for the second UE (Tx-UE) to transmit data TB or MAC PDU over sidelink to avoid the described hidden-node and half-duplex problems, it is proposed to adopt the following cooperated resource selection scheme for the first UE.

Method for Cooperated Sidelink Resource Selection and Reporting at First UE (Rx-UE):

Sensing of sidelink resource utilization and reservation of a sidelink resource pool (RP): The method comprises receiving SL data traffic and transmission related information from the second UE (Tx-UE) and determining a sidelink resource pool for sensing. The method further comprises performing sensing/monitoring on the determined sidelink resource pool by decoding PSCCH and receiving SCI within a sensing window, measuring RSRP for the decoded PSCCH and measuring CBR.

Performing exclusion of SL resources from a set of candidate resources when one or more of the followings occurs: 1. Overlapping in both frequency resource blocks and time slot with a resource reserved by another UE and the measured RSRP of the reserved resource is higher than a RSRP threshold or the difference of the measured RSRPs for the second and the said another UE is larger than a level. 2. Overlapping in time with a periodically reserved resource indicated by another UE. 3. Overlapping in time with a resource already selected or reserved by the first UE or by another UE which belong to the same groupcast session, DRX cycle of the first UE, and/or first UE's scheduled/planned UL transmission and/or DL reception.

Reporting of remaining resources in the candidate set or slot timings to the second UE (Tx-UE): Reporting could be periodic or event triggered. Additional information can be reported include selection of resource pool index or type (e.g. inclusion of PSFCH resources), resource selection window (T1 starting slot/a slot offset and/or T2), source ID, destination ID, and/or measured CBR of the selected resource pool.

In order for the second UE to perform selection of one or more sidelink resources for transmission of data TB or MAC PDU over sidelink to avoid the described hidden-node and half-duplex problems, it is proposed to adopt the following cooperated resource selection scheme for the second UE.
Method for Cooperated Sidelink Resource Selection and Reporting at Second UE (Tx-UE):
Providing/Transmitting Information Relating to Resource Allocation as Part of UEIA and/or SCI Over Sidelink:

The SL data, traffic and transmission attribute information can include one or more of the followings: 1. Packet priority or Layer 1 priority of the data TB or MAC PDU ($prio_{TX}$). 2. Size of the data TB or MAC PDU, MCS index and/or MCS table. 3. Frequency resource size/number of contiguous subchannels ($L_{subCH}$). 4. Remaining PDB for the data TB/MAC PDU, start timing of resource selection window, length of the resource selection window, and/or $T_2$ 5. Resource reservation interval/period ($P_{rsvp\_TX}$). 6. HARQ feedback indicator and/or PSFCH resource configuration. 7. Sidelink resource pool. This information is provided/transmitted periodically or event triggered.

Receiving information relating to resource selection from the first UE: Resource selection information contains at least one set of candidate sidelink resources preferred by the first UE. Additional information may be received from the first UE include selection of resource pool index or type (e.g. inclusion of PSFCH resources), resource selection window (T1 starting slot/a slot offset and/or T2), source ID, destination ID, and/or measured CBR of the selected resource pool.

Selecting One or More Resources for SL Transmission Based on a Resource Sensing and Exclusion Procedure at Second UE:

In some embodiments, sensing operation is at least based on decoding PSCCH/SCI and measuring RSRP of the received PSCCH/SCI in slots belong to a resource pool. Another set of candidate resources is initialized at the second UE by taking the reported set of candidate resources preferred by the first UE or by initializing to a set of all possible resources within a selection window. Exclusion of resources is performed from the another set of candidate resources based on at least the sensing outcome. Further resources could be excluded due to time overlapping with already selected and/or reserved resources by the second UE for transmission of other TBs/MAC PDUs, and/or time overlapping with scheduled/planned UL transmission and/or DL reception by the second UE. If remaining candidate set determined by the second UE was not taken from the reported resource set from the first UE, the final selection of SL resource should be based on the common resources between the two sets. Then, the final selection of SL resource can be performed by the second UE based on random selection or prioritizing resources that are earlier in time.

Commercial interests for some embodiments are as follows. 1. Solving issues in the prior art. 2. Mitigating a transmission collision. 3. Providing good communication performance. 4. Providing high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, smart watches, wireless earbuds, wireless headphones, communication devices, remote control vehicles, and robots for public safety use, AR/VR device maker for example gaming, conference/seminar, education purposes, smart home appliances including TV, stereo, speakers, lights, door bells, locks, cameras, conferencing headsets, and etc., smart factory and warehouse equipment including IIoT devices, robots, robotic arms, and simply just between production machines. In some embodiments, commercial interest for the disclosed invention and business importance includes lowering power consumption for wireless communication means longer operating time for the device and/or better user experience and product satisfaction from longer operating time between battery charging. Some embodiments of the present disclosure are a combination of "techniques/processes" that can be adopted in 3GPP specification to create art end product. Some embodiments of the present disclosure relate to mobile cellular communication technology in 3GPP NR Release 17 and beyond for providing direct device-to-device (D2D) wireless communication services.

Figure 7:
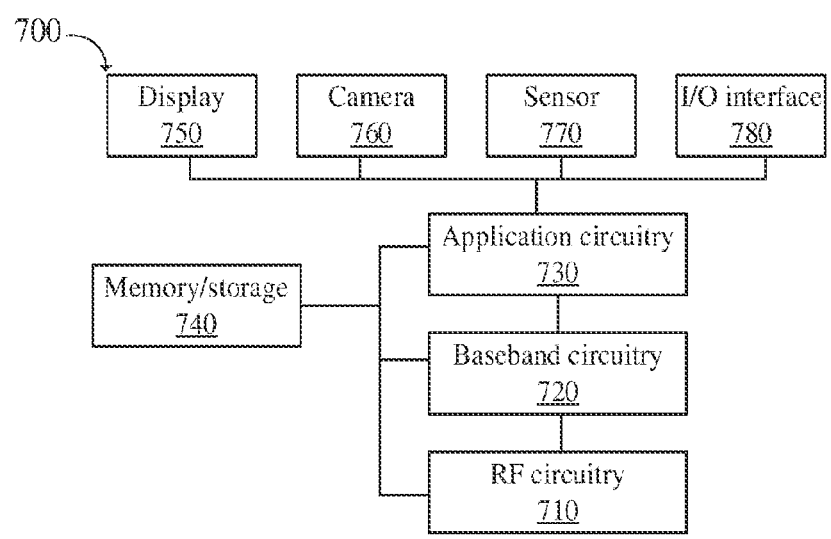
FIG. 7 is a block diagram of a system for wireless communication according to an embodiment of the present disclosure.

FIG. 7 is a block diagram of an example system 700 for wireless communication according to an embodiment of the present disclosure. Embodiments described herein may be implemented into the system using any suitably configured hardware and/or software. FIG. 7 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A resource selection method in sidelink communication by a first user equipment (UE), comprising:
   receiving sidelink data traffic and transmission related information from a second UE; and
   reporting, to the second UE, a set of one or more preferred resources or slot timings of a sidelink resource pool, wherein the preferred resources or slot timings of the sidelink resource pool enables the second UE to select one or more resources for sidelink transmission based on resource sensing and exclusion, by performing sensing operation based on a decoding physical sidelink control channel/sidelink control information (PSCCH/SCI) and a measuring reference signal received power (RSRP) of a received PSCCH/SCI in slots belong to the sidelink resource pool; initializing a set of candidate resources by taking a reported set of preferred resources from the first UE or by initializing to a set of all possible resources within a selection window in the sidelink resource pool; and performing exclusion of resources from the set of candidate resources based on a sensing outcome, and wherein if a remaining candidate set after the resource exclusion is not based on the reported set of preferred resources from the first UE, a final selection of sidelink resource is based on common resources between the remaining candidate set and the reported resource set.

2. The method of claim 1, further comprising:

performing sensing on the sidelink resource pool; and performing exclusion of one or more sidelink resources from a candidate set of the sidelink resource pool.

3. The method of claim 2, wherein performing sensing on the sidelink resource pool is according to at least one of the followings:

the sidelink data traffic and transmission related information;

an indication from the second UE; or a corresponding resource pool in which the SCI is transmitted from the second UE.

4. The method of claim 3, wherein the sidelink data traffic and transmission related information is provided as a part of UE assistance information (UEAI) and/or SCI from the second UE.

5. The method of claim 3, wherein the sidelink data traffic and transmission related information comprises at least one of the followings:

a packet priority or layer 1 priority information for a transport block (TB) or a medium access control (MAC) protocol data unit (PDU) to be transmitted;

a size of the TB or the MAC PDU, a modulation and coding scheme (MCS) index, and/or a MCS table;

a frequency resource size or a number of contiguous subchannels;

a remaining packet delay budget (PDB) for the TB or the MAC PDU, a start timing of a resource selection window, and/or a length of the resource selection window;

a resource reservation interval/periodicity;

a hybrid automatic repeat request (HARQ) feedback indicator and/or a physical sidelink feedback channel (PSFCH) resource configuration; or the sidelink resource pool.

6. The method of claim 1, wherein reporting, to the second UE, the set of one or more preferred resources or slot timings of the sidelink resource pool is periodic or event triggered.

7. The method of claim 1, further comprising reporting, to the second UE, an additional information of the sidelink resource pool.

8. The method of claim 7, wherein the additional information of the sidelink resource pool comprises a selection of a resource pool index or type, a resource selection window, a source identifier (ID), a destination ID, and/or a measured channel busy ratio (CBR) of the sidelink resource pool.

9. A resource selection method in sidelink communication by a second user equipment (UE), comprising:

transmitting, to a first UE, sidelink data traffic and transmission related information;

receiving, from the first UE, a set of one or more preferred resources or slot timings of a sidelink resource pool; and selecting one or more resources for sidelink transmission based on resource sensing and exclusion, wherein selecting the one or more resources for sidelink transmission based on resource sensing and exclusion comprises: performing sensing operation based on a decoding physical sidelink control channel/sidelink control information (PSCCH/SCI) and a measuring reference signal received power (RSRP) of a received PSCCH/SCI in slots belong to the sidelink resource pool; initializing a set of candidate resources by taking a reported set of preferred resources from the first UE or by initializing to a set of all possible resources within a selection window in the sidelink resource pool; and performing exclusion of resources from the set of candidate resources based on a sensing outcome, and wherein if a remaining candidate set after the resource exclusion is not based on the reported set of preferred resources from the first UE, a final selection of sidelink resource is based on common resources between the remaining candidate set and the reported resource set.

10. The method of claim 9, wherein the sidelink data traffic and transmission related information is provided as a part of UE assistance information (UEAI) and/or the SCI to the first UE.

11. The method of claim 9, wherein the sidelink data traffic and transmission related information comprises at least one of the followings:

a packet priority or layer 1 priority information for a transport block (TB) or a medium access control (MAC) protocol data unit (PDU) to be transmitted;

a size of the TB or the MAC PDU, a modulation and coding scheme (MCS) index, and/or a MCS table;

a frequency resource size or a number of contiguous subchannels;

a remaining packet delay budget (PDB) for the TB or the MAC PDU, a start timing of a resource selection window, and/or a length of the resource selection window;

a resource reservation interval/periodicity;

a hybrid automatic repeat request (HARQ) feedback indicator and/or a physical sidelink feedback channel (PSFCH) resource configuration; or the sidelink resource pool.

12. The method of claim 9, wherein receiving, from the first UE, the set of one or more preferred resources or slot timings of the sidelink resource pool is periodic or event triggered.

13. The method of claim 9, further comprising receiving, from the first UE, an additional information of the sidelink resource pool, wherein the additional information of the sidelink resource pool comprises a selection of a resource pool index or type, a resource selection window, a source identifier (ID), a destination ID, and/or a measured channel busy ratio (CBR) of the sidelink resource pool.

14. The method of claim 9, wherein transmitting, to the first UE, the sidelink data traffic and transmission related information is periodic or event triggered.

15. A first user equipment (UE), comprising:
a memory;
a transceiver; and
a processor coupled to the memory and the transceiver;
wherein the processor is configured to perform a resource selection method in sidelink communication, comprising:
receiving sidelink data traffic and transmission related information from a second UE; and
reporting, to the second UE, a set of one or more preferred resources or slot timings of a sidelink resource pool,
wherein the preferred resources or slot timings of the sidelink resource pool enables the second UE to select one or more resources for sidelink transmission based on resource sensing and exclusion, by performing sensing operation based on a decoding physical sidelink control channel/sidelink control information (PSCCH/SCI) and a measuring reference signal received power (RSRP) of a received PSCCH/SCI in slots belong to the sidelink resource pool; initializing a set of candidate resources by taking a reported set of preferred resources from the first UE or by initializing to a set of all possible resources within a selection window in the sidelink resource pool; and performing exclusion of resources from the set of candidate resources based on a sensing outcome, and
wherein if a remaining candidate set after the resource exclusion is not based on the reported set of preferred resources from the first UE, a final selection of sidelink resource is based on common resources between the remaining candidate set and the reported resource set.

16. A second equipment (UE), comprising:
a memory;
a transceiver; and
a processor coupled to the memory and the transceiver;
wherein the processor is configured to perform a resource selection method in sidelink communication, comprising:
transmitting, to a first UE, sidelink data traffic and transmission related information;
receiving, from the first UE, a set of one or more preferred resources or slot timings of a sidelink resource pool; and
selecting one or more resources for sidelink transmission based on resource sensing and exclusion,
wherein selecting the one or more resources for sidelink transmission based on resource sensing and exclusion comprises: performing sensing operation based on a decoding physical sidelink control channel/sidelink control information PSCCH/SCI) and a measuring reference signal received power (RSRP) of a received PSCCH/SCI in slots belong to the sidelink resource pool; initializing a set of candidate resources by taking a reported set of preferred resources from the first UE or by initializing to a set of all possible resources within a selection window in the sidelink resource pool; and performing exclusion of resources from the set of candidate resources based on a sensing outcome, and
wherein if a remaining candidate set after the resource exclusion is not based on the reported set of preferred resources from the first UE, a final selection of sidelink resource is based on common resources between the remaining candidate set and the reported resource set.

* * * * *